US007206865B2

(12) United States Patent
Creta et al.

(10) Patent No.: US 7,206,865 B2
(45) Date of Patent: Apr. 17, 2007

(54) APPARATUS AND METHOD FOR COMBINING WRITES TO I/O

(75) Inventors: Kenneth C. Creta, Gig Harbor, WA (US); Gregory D. Cummings, Portland, OR (US); Sujoy Sen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 10/402,125

(22) Filed: Mar. 28, 2003

(65) Prior Publication Data

US 2004/0193757 A1 Sep. 30, 2004

(51) Int. Cl.
*G06F 13/14* (2006.01)
(52) U.S. Cl. .................. 710/5; 710/8; 710/9; 710/52
(58) Field of Classification Search ............... 710/35, 710/52, 112, 306, 310; 711/146, 154, 167–169; 345/522
See application file for complete search history.

(56) References Cited

U.S. PATENT DOCUMENTS

| | | | | |
|---|---|---|---|---|
| 5,561,780 A | * | 10/1996 | Glew et al. ............... | 711/126 |
| 6,101,568 A | * | 8/2000 | Richardson .............. | 710/310 |
| 6,233,641 B1 | * | 5/2001 | Graham et al. ........... | 710/316 |
| 6,587,929 B2 | * | 7/2003 | Henry et al. ............. | 711/141 |
| 6,681,311 B2 | * | 1/2004 | Gaskins et al. ........... | 711/203 |
| 6,748,496 B1 | * | 6/2004 | Scarpino .................. | 711/137 |
| 2003/0023666 A1 | * | 1/2003 | Conway et al. ........... | 709/201 |

OTHER PUBLICATIONS

Thomas R. Craver, "Hyper-Threading Technology and Write Combining Store Buffers: Understanding, Detecting, and Correcting Performance Issues", Intel Software Network, Jul. 18, 2005, http://www.intel.com/cd/ids/developer/asmo-na/eng/20465.htm?prn=Y., 11 pages.
Raoul A.F. Bhoedjang, et al., "User-Level Network Interface Protocols", IEEE, Nov. 1998, pp. 53-60.

* cited by examiner

*Primary Examiner*—Ilwoo Park
(74) *Attorney, Agent, or Firm*—Blakely, Sokoloff, Taylor & Zafman LLP

(57) ABSTRACT

An apparatus and method for outbound I/O write-combining are described. In one embodiment the method includes the detection of a write transaction request directed to an I/O device. Once detected, it is determined whether an address associated with the detected write transaction falls within a predetermined write-combinable range of the memory mapped I/O space assigned to the I/O device. When the transaction address falls within a write-combinable range, data associated with the detected write transaction is stored within a buffer corresponding to the transaction address. Accordingly, one embodiment of the present invention provides write-combining for data written to an I/O port associated with a memory mapped I/O address space.

19 Claims, 13 Drawing Sheets

APPARATUS AND METHOD FOR COMBINING WRITES TO I/O

FIELD OF THE INVENTION

One or more embodiments of the invention relate generally to the field of integrated circuit and computer system design. More particularly, one embodiment of the invention relates to a method and apparatus for combining I/O (input/output) writes.

BACKGROUND OF THE INVENTION

The development of ever more advanced microprocessors and associated bus architectures continues at a rapid pace. Current computer systems employ advanced architectures and processors such as Pentium Pro®, Pentium II®, Pentium III®, and Pentium IV® processors, as manufactured by the Intel Corporation of Santa Clara, Calif. In such computer systems, the bus architecture is optimized for burst performance. Generally, the bus architecture may include dedicated buses for one-to-one coupling of devices, or non-dedicated buses that are multiplexed by a number of units and devices (e.g., bus agents). By optimizing the bus architecture for burst performance, the system processor is able to achieve very high memory and I/O bandwidths.

One technique for providing burst performance is provided by caching of data within either the level one (L1) or level two (L2) caches available to the processor. For example, when the processor recognizes that an operand being read from memory is cacheable, the processor reads an entire cache line into the appropriate cache. This operation is generally referred to as a "cache line fill." Likewise, writes to memory are cached and written to memory in cache line bursts write cycles. Unfortunately, within certain applications, such as graphics applications, writes from the processor are most often pixel writes. As a result, the writes tend to be 8-bit, 16-bit or 32-bit quantities, rather than the full cache lines required to provide burst performance.

As a result, a processor is normally unable to run burst cycles for graphics operations. To address this problem, advanced computer architectures are designed to use a new caching method, or memory type that allows internal buffers of the processor to be used to combine smaller or partial writes (automatically) into larger burstable cache line writes, which is referred to herein as "write-combining." In order to provide write-combining within a memory region, the memory region is defined as having a write-combining (WC) memory type.

However, the WC memory type is a weakly ordered memory type. System memory locations designated as WC are not cached, and coherency is not enforced by the processor's coherency protocol. In addition, writes may be delayed and combined in the write-combining buffers to reduce partial memory writes. Unfortunately, processor write-combining makes no guarantees with respect to the order in which bits are flushed from the write-combining buffers. As a result, the burst performance capability provided by write-combining may not be useful to applications which have strict requirements as to the order in which bits are flushed from the write-combining buffers. Furthermore, the available write-combining buffer sizes may be insufficient for certain applications which require high efficiency.

BRIEF DESCRIPTION OF THE DRAWINGS

The various embodiments of the present invention are illustrated by way of example, and not by way of limitation, in the figures of the accompanying drawings and in which.

DETAILED DESCRIPTION

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

System Architecture

Figure 1:
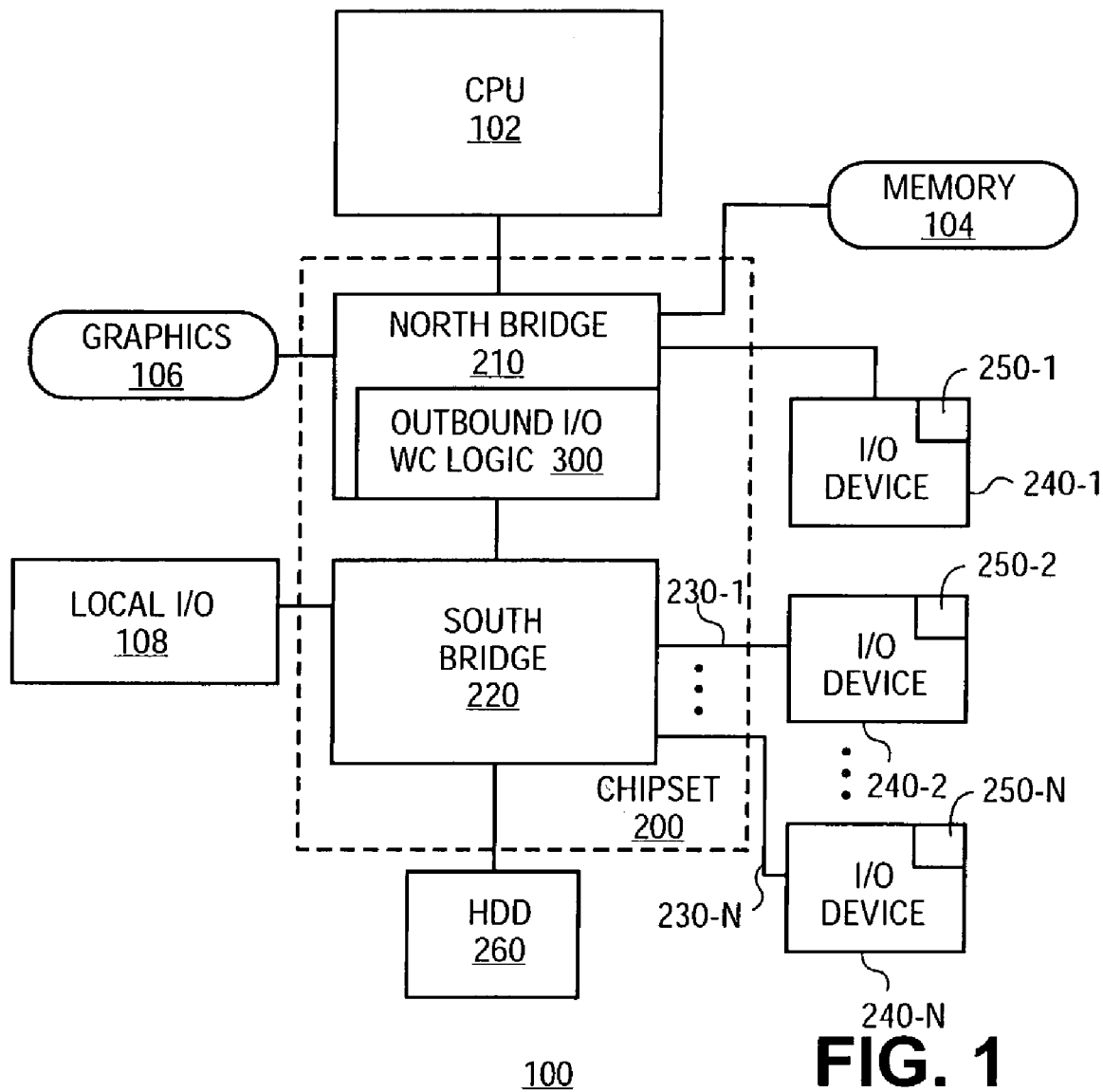
FIG. 1 depicts computer system, including outbound I/O (input/output) write-combining logic, in accordance with one embodiment of the present invention.

FIG. 1 is a block diagram illustrating a computer system 100, including outbound I/O (input/output) write-combining logic 300, in accordance with one embodiment of the present invention. As illustrated, computer system 100, includes a CPU 102, memory 104 and graphics controller 106 coupled to north bridge 210. As described herein, the north bridge may be referred to as a memory controller, and in one embodiment may be referred to as a memory controller hub (MCH). In addition, computer system 100 includes south bridge 220, which is coupled to local I/O 108 and hard disk drive devices (HDD) 260.

In the embodiment illustrated, south bridge 220 is coupled to I/O bus 230, which couples a plurality of I/O devices 240 (240, ..., 240-N). As described herein, the south bridge may be referred to as an I/O controller, and in one embodiment is referred to as an I/O controller hub (ICH). Collectively, the north bridge 210 and south bridge 220 are referred to as chipset 200. As described herein, the term "chipset" is used in a manner well known to those skilled in the art to describe, collectively, the various devices coupled to CPU 102 to perform desired system functionality.

In contrast to conventional computer systems, computer system 100 includes chipset 200 which in one embodiment includes outbound I/O write-combining logic 300. In the embodiment depicted, outbound I/O write-combining logic 300 is illustrated within north bridge 210. However, the write-combining logic may be performed within a chipset which does not include separate north and south bridges. As described in further detail below, write-combining logic 300 is provided to combine writes directed to I/O devices 240 of I/O bus 230. In one embodiment, write-combining is provided for write transactions directed to I/O devices coupled to the chipset 200 via, for example, a peripheral component interconnect (PCI) express (PCI Express) interface.

As known to those skilled in the art, I/O devices may be accessed by mapping a portion of the processor's physical memory address space to the various I/O device ports. When using memory mapped I/O, the memory mapped I/O space is generally designated as uncacheable memory. The uncacheable memory type designation is enforced in I/O devices, since I/O devices generally have very strict ordering requirements for reads and writes. This unreliable ordering model is due to the fact that the write-combining memory type is a weakly ordered memory type.

Figure 2:
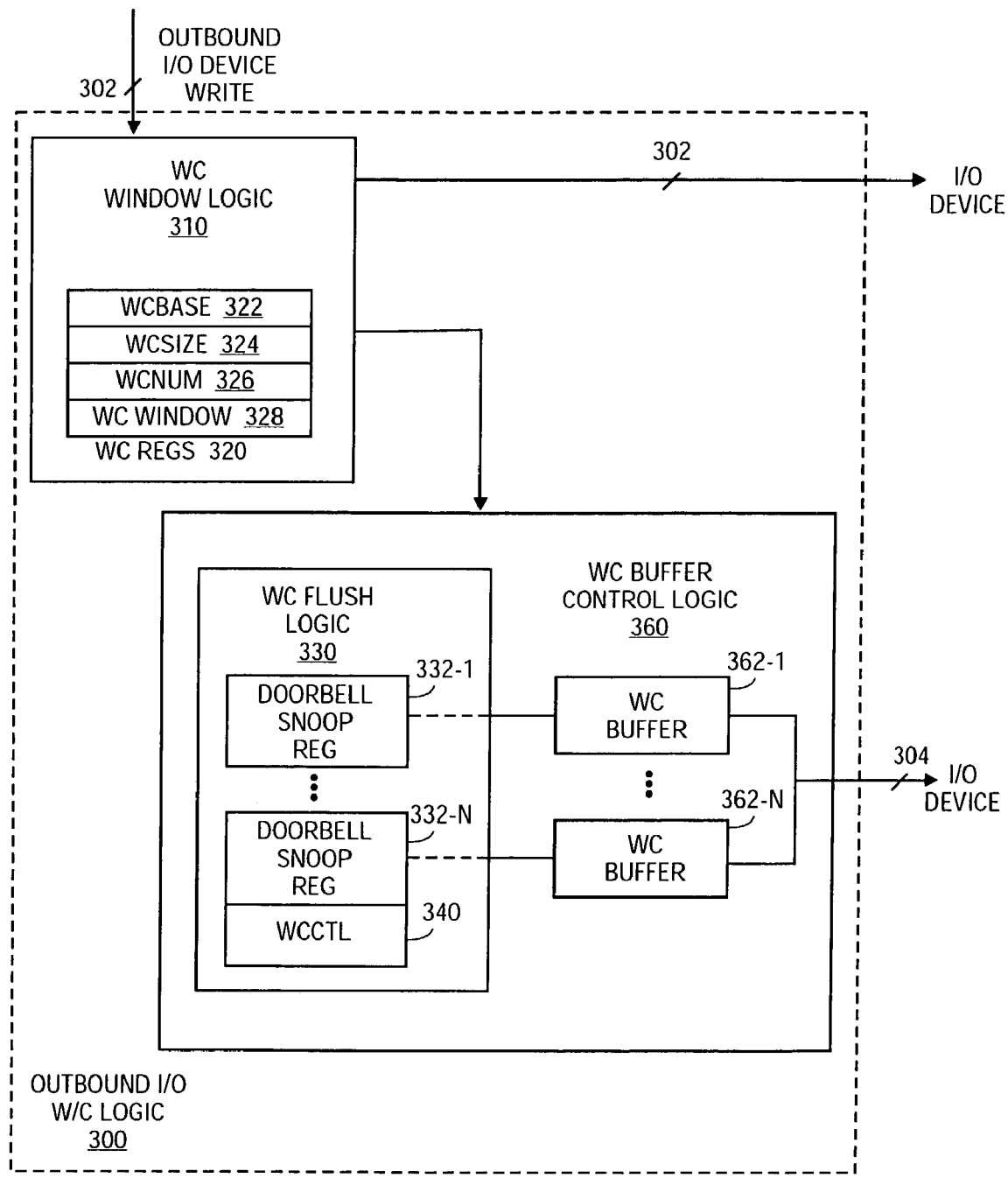
FIG. 2 depicts a block diagram further illustrating the outbound I/O write-combining logic of computer system, as depicted in FIG. 1, in accordance with a further embodiment of the present invention.

Accordingly, one embodiment of the present invention provides I/O write-combining logic 300, which is further illustrated with reference to FIG. 2. As illustrated, the outbound write-combining logic 300 includes write-combining window logic 310. The write-combining window logic includes a plurality of write-combining registers (WCREGS) 320. The plurality of registers include write-combining base (WCBASE) register 322, write-combining size (WCSIZE) register 324, write-combining number (WC-NUM) register 326 and write-combining window (WCWINDOW) register 328.

In one embodiment, WCBASE 322 specifies an address within the memory mapped I/O space selected as the write-combining base address. In this embodiment, WCSIZE 324 specifies the size of one or more write-combinable ranges. Likewise WCNUM register 326 specifies-the number of write-combinable ranges within the memory mapped region assigned to a respective I/O device. Finally, WCWINDOW register 328 specifies the size of the write-combining window(s). In one embodiment, I/O device driver software sets the values with WCREGS 320 to direct the chipset's implementation of outbound I/O write-combining.

For example, as illustrated with reference to FIG. 3, memory mapped I/O space 400 includes an area of physical memory mapped to an I/O device 240. Within this area, a write-combinable range 410 is defined according to the values contained within the WCBASE 322 and WCSIZE 324 registers (416 and 412). Within the write-combinable range 410, write-combining window 420 is defined by the contents of WCWINDOW register 328. As further illustrated, in one embodiment the chipset 200 assigns a value for WCWINDOW offset 414.

Referring again to FIG. 2, the write-combining window logic 300 utilizes WC buffer control logic 360. The WC buffer control logic 360 includes a plurality of WC buffers 362 (362-1, ..., 362-N). In addition, in the embodiment depicted, logic 360 includes WC flush logic 330. In one embodiment, a one-to-one correspondence is provided between each write-combinable range 410, as illustrated in FIG. 3, to each write-combining buffer 362. In other words, for each write-combinable range defined within the I/O space 400, a corresponding WC buffer 362 will be assigned to store or write-combine write data directed to the corresponding I/O device 240.

As such, in one embodiment, WC window logic 310 receives an outbound I/O device write. For example, in one embodiment processor 102 may desire to write data to an I/O device 240. Accordingly, for example, north bridge 210 would intercept the write transaction request as outbound write 302. Once intercepted, the WC window logic 310 would determine whether an address associated with the write transaction falls within the write-combinable address range 410 (FIG. 3). When such is the case, a corresponding write-combining window within the write-combinable range is determined for the write transaction. Once determined, the data is stored in the corresponding WC buffer 362.

In addition, write-combining logic 300 further includes WC flush logic 330 within control logic 360. In an alternative embodiment, WC flush logic 330 is separate from WC control logic 360. WC flush logic 330 includes a plurality of doorbell snoop registers 332 (332-1, ..., 332-N). In one embodiment, the various doorbell snoop registers are used to detect a flush request of a respective WC buffer 362 received from, for example, I/O device driver software. For example, in one embodiment, as illustrated in FIG. 1, each I/O device 240 includes one or more doorbell registers 250 (250-1, ..., 250-N). As a result, the I/O device driver software is able to direct flushing of a WC 362 buffer by performing a write to a doorbell register 250 of the I/O device 240.

In one embodiment, detection of such a write is performed utilizing doorbell snoop register 332 (332-1, ..., 332-N). In this embodiment, the doorbell snoop register 332 will contain a value which is utilized to identify a device driver write to one of the doorbell registers 250 of the respective I/O device 240. Accordingly, when such a write is detected, WC flush logic 330 determines a corresponding WC buffer 362 assigned to the I/O device doorbell register 250. Once determined, the WC buffer data is flushed to the corresponding I/O device 240. Furthermore, the WC flush logic 330 is responsible for monitoring contents of the WC buffers 362 in order to maintain compliance with the respective I/O protocol data ordering rules.

For example, in one embodiment the WC buffers 362 are generally flushed out in a linearly increasing order. In such an embodiment, this guarantee implies that device driver software can make certain ordering assumptions and optimizations. However, with certain protocols such as, for example, the PCI Express protocol, certain conditions may require flushing of the write-combining buffers 362. For example, all windows on a given port are flushed if an outbound write targets a PCI Express port but falls outside all implemented write-combinable ranges and does not match any doorbell registers.

Furthermore, in one embodiment, an inbound read completion flushes out all write-combining windows in order to comply with PCI ordering rules. In addition, an outbound non-posted request which targets the same PCI Express port requires flushing of the various WC buffers 362. Collectively, these events are referred to herein as I/O port flush conditions. Accordingly, in one embodiment, a write-combining control (WCCTL) register 340 is provided. Within the register 340, various control bits are provided to determine whether to override the various I/O port flush conditions described above. Consequently, I/O device driver software is able to comply with the various program order write conditions by using the various doorbell registers to direct flushing of the WC buffers 362, as needed.

In one embodiment, overriding of the various I/O port flush conditions is determined prior to device startup utilizing the I/O device driver software, which sets control bits within WCCTL register 340. Accordingly, based on the contents of the various WCREGS 320 and WCCTL 340, the I/O write-combining logic 300 is directed to write-combining data of write transaction requests directed to the various I/O devices. Furthermore, as illustrated with reference to FIG. 4, a plurality of write-combinable ranges may be established within the memory mapped to the I/O device.

In one embodiment, the chipset may implement up to 256 write-combinable ranges as specified by WCNUM 326. In one embodiment, a device driver associated with the respective I/O device is responsible for updating WCREGS 320 in order to define the write-combinable range(s), as well as the write-combining windows and associated write-combining buffers which will be utilized by the chipset 200. Procedural methods for implementing embodiments of the present invention and device driver software are now described.

Operation

Figure 5:
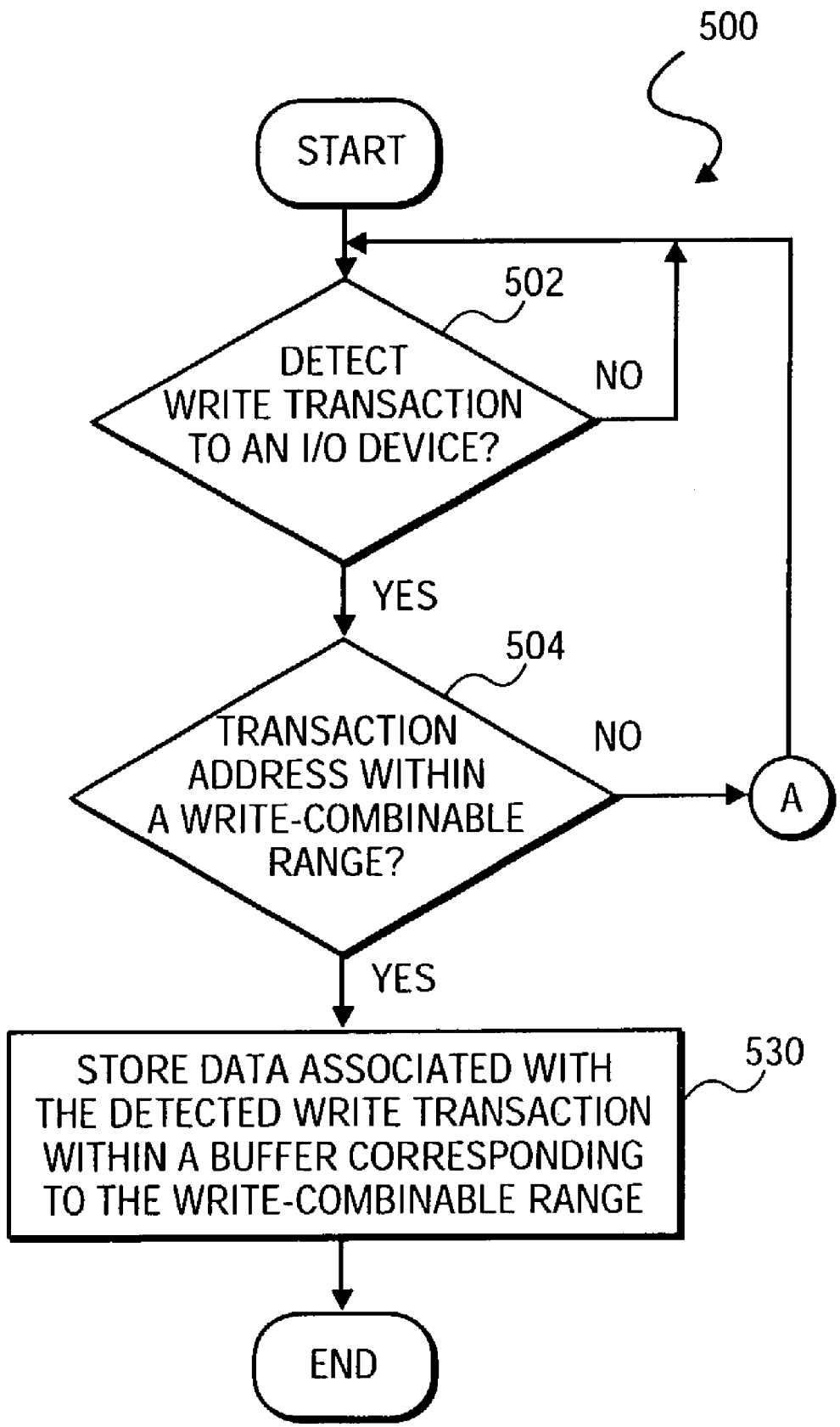
FIG. 5 depicts a flow chart illustrating a method for write-combining data of write transactions directed to an I/O device, in accordance with one embodiment of the present invention.

FIG. 5 is a flow chart illustrating a method 500 for write-combining data of write transactions directed to an I/O device, in accordance with one embodiment of the present invention, which is referred to herein as outbound I/O write-combining. In one embodiment, the outbound I/O write-combining is performed within, for example, a chipset such as depicted with reference to FIG. 1. In a further embodiment, the outbound I/O write-combining may be performed within a memory controller hub portion of a chipset, for example, as depicted with reference to FIG. 1.

Referring again to FIG. 5, at process block 502 it is determined whether a write-transaction request is directed to an I/O (input/output) device. For example, as depicted with reference to FIG. 1, processor 102 may desire to write data to I/O device 240. Accordingly, the write transaction request could be intercepted by, for example, north bridge 210. As such, when the write transaction is directed to an I/O device, the write transaction may be provided to outbound I/O write-combine logic 300.

Figure 6:
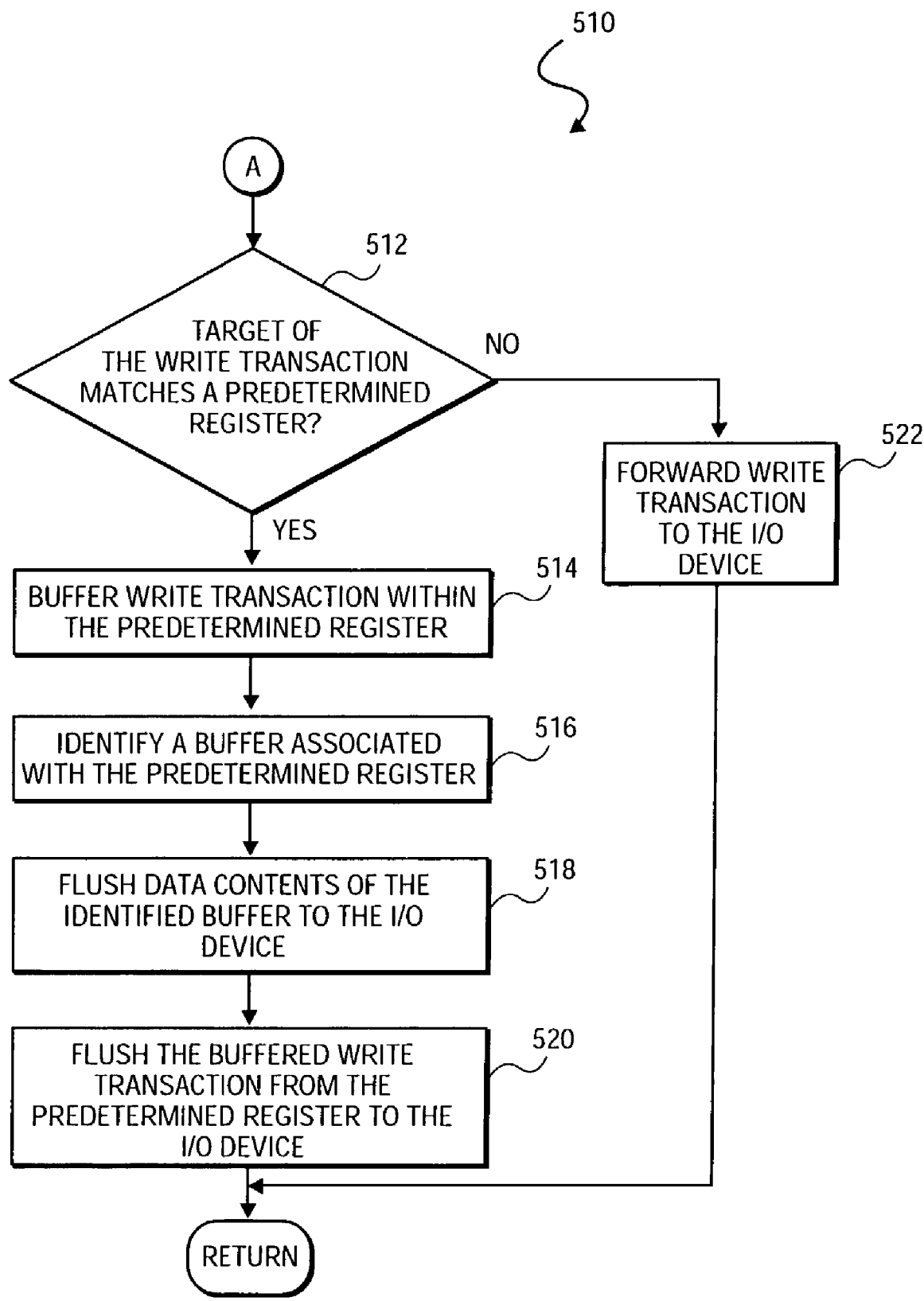
FIG. 6 depicts a flow chart illustrating a method for detecting a request to flush a write-combining buffer and performing the requested flushing, in accordance with one embodiment of the present invention.

At process block 504 it is determined whether the transaction address falls within a write-combinable range. In one embodiment, the write-combinable range is predefined within a memory mapped I/O space assigned to the respective I/O device. As such, when the transaction address falls within a write-combinable range, at process block 530, data associated with the detected write transaction is stored within a write-combining (WC) buffer assigned to the write-combinable range; otherwise, control flow branches to flow chart 510, as shown in FIG. 6. In doing so, one embodiment enables burst performance of write transactions directed to I/O devices.

FIG. 6 is a flow chart illustrating a method 510 for detecting a WC buffer flush request, in accordance with one embodiment of the present invention. At process block 512, it is determined whether a target (transaction address) of a write transaction matches a predetermined register. In one embodiment, the predetermined register refers to, for example, a doorbell register of an I/O device assigned according to device driver software (see FIGS. 1 and 2). In addition, the transaction address refers to a portion of the memory mapped I/O assigned to the register.

According to this embodiment, the I/O device driver software updates one or more chipset registers with values to identify the I/O device doorbell registers (mapped I/O address). As such, when a match is detected, at process block 514, the write transaction is buffered within a doorbell (predetermined) register. At process block 516, a WC buffer associated with the predetermined register is identified. In this embodiment, the I/O device driver software directs, for example, the chipset to assign a respective WC buffer to each I/O device doorbell snoop register (and corresponding doorbell register). Next, at process block 518, data contents of the identified WC buffer are flushed to the corresponding I/O device. Once flushed, at process block 520, the buffered write transaction is flushed from the predetermined register to the I/O device.

Figure 7:
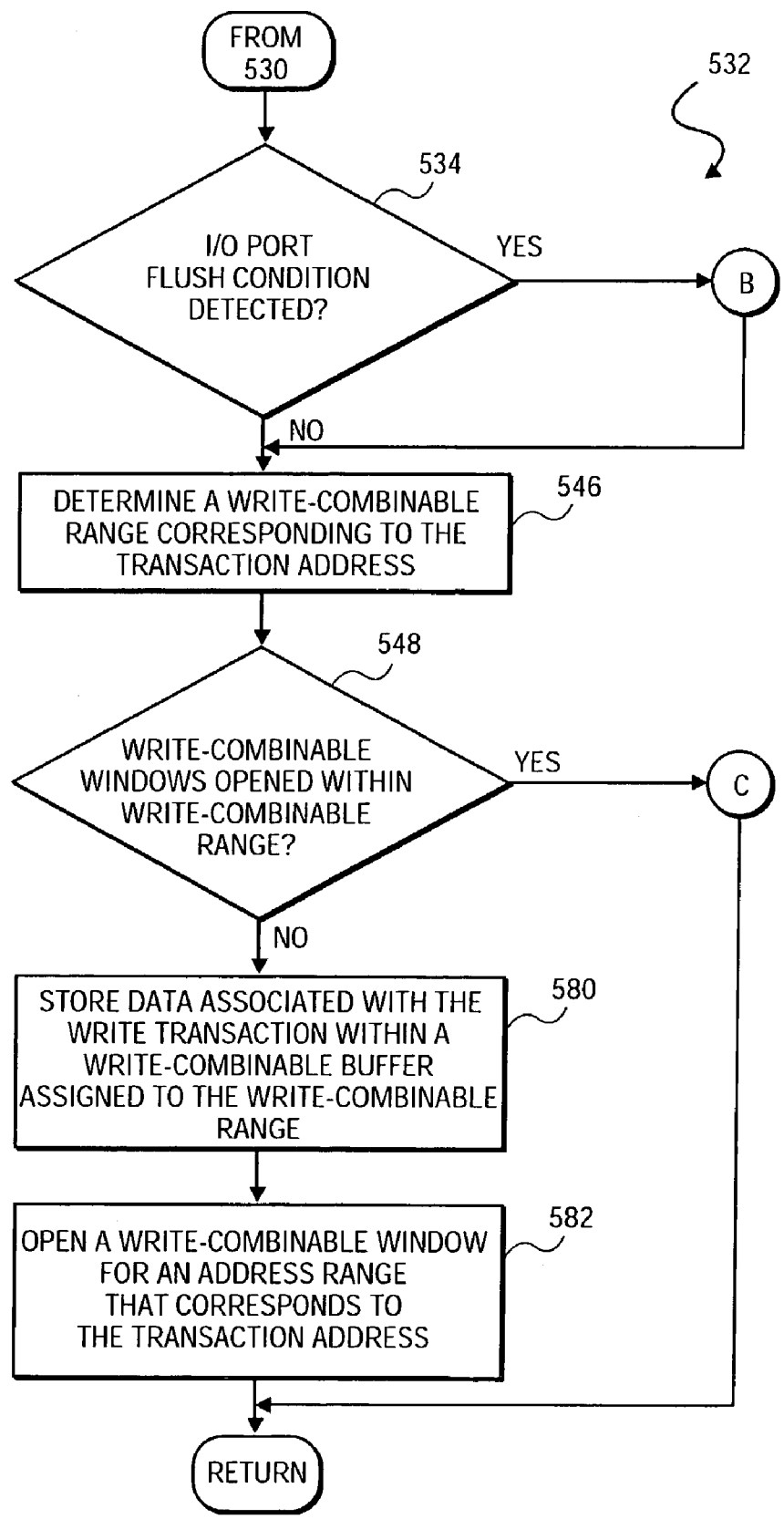
FIG. 7 depicts a flow chart illustrating an additional method for write-combining transaction data within a write-combining buffer, in accordance with a further embodiment of the present invention.

FIG. 7 is a flow chart illustrating a method 532 for combining I/O writes in accordance with a further embodiment of the present invention. At process block 534 it is determined whether an I/O port flush condition is detected. In one embodiment, the I/O port flush conditions are detected and determined, according to data ordering rules prescribed by the I/O protocol governing attached I/O devices, such as, for example, PCI Express, or the like. Once the I/O port flush condition is resolved, process block 546 is performed.

At process block 546, a write-combinable range corresponding to a transaction address is identified. At process block 548 it is determined whether a write-combining window, assigned to the identified write-combinable range is open. When all windows within the identified write-combinable range are closed, process block 580, is performed. Otherwise, control flow branches to block C of FIG. 9. At process block 580 data associated with the write transaction is stored within a WC buffer assigned to the write-combinable range. At process block 572 a write combining window is opened for an address range of the identified write-combinable range that corresponds to the transaction address.

Figure 8:
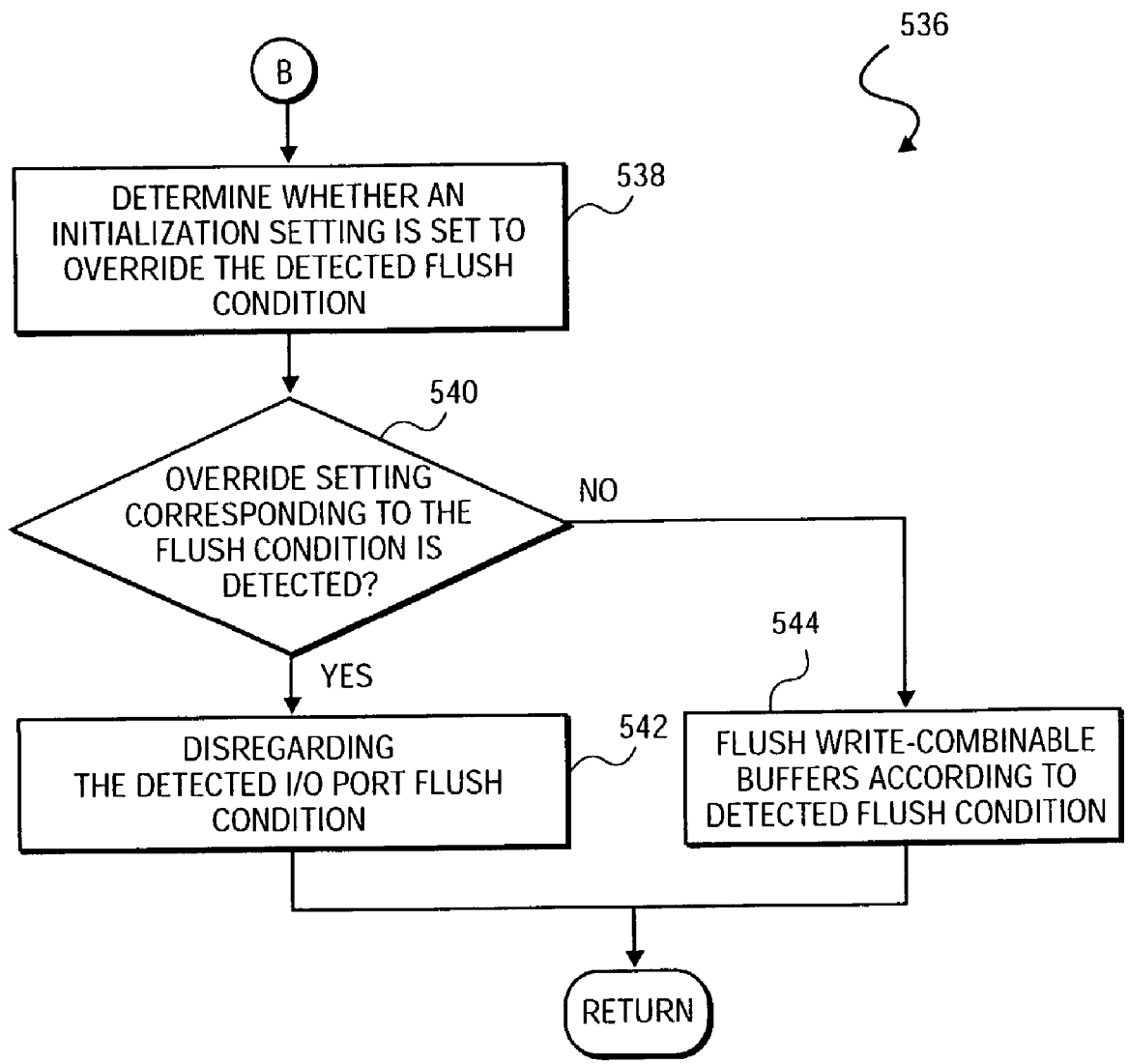
FIG. 8 depicts a flow chart illustrating a method for overriding detected I/O port flush conditions in accordance with detected configuration settings, in accordance with a further embodiment of the present invention.

FIG. 8 is a flow chart illustrating a method 536 performed when an I/O port flush condition is detected, in accordance with one embodiment of the present invention. When an I/O port flush condition is detected, at process block 538, it is determined whether an initialization setting is set to override the detected I/O port flush condition. When such a setting is detected, at process block 540, the detected I/O port flush condition is disregarded at process block 542. Otherwise, at process block 544, one or more WC buffers are flushed according to the detected I/O port flush condition.

Figure 9:
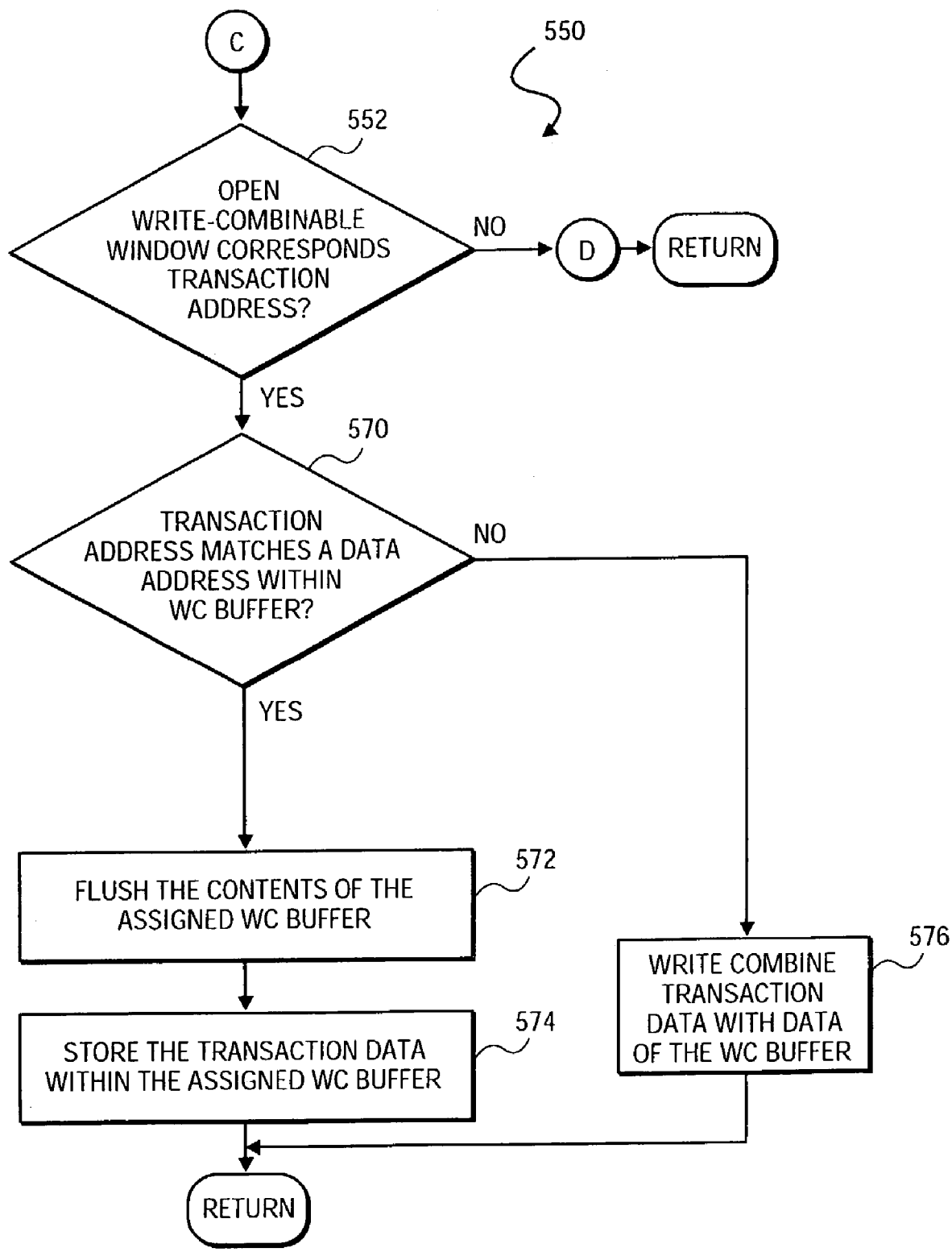
FIG. 9 depicts a flow chart illustrating a method for storing data within a write-combining buffer when a write-combining window is open within a write-combinable range, in accordance with a further embodiment of the present invention.

FIG. 9 is a flow chart illustrating a method 540 for outbound I/O write-combining when an open WC window is detected, in accordance with a further embodiment of the present invention. At process block 552 it is determined whether an address range associated with the open WC window corresponds to the transaction address of the detected write transaction. When correspondence is detected, at process block 570, it is determined whether a data address within the assigned WC buffer corresponds to the transaction address. When such a condition is detected, process block 572 is performed; otherwise, at process block 576, the transaction data is write-combined with data contained within the assigned WC buffer. At process block 572, contents of the assigned WC buffer are flushed to a corresponding I/O device. Once flushed, the transaction data is stored within the assigned WC buffer at process block 574.

Figure 10:
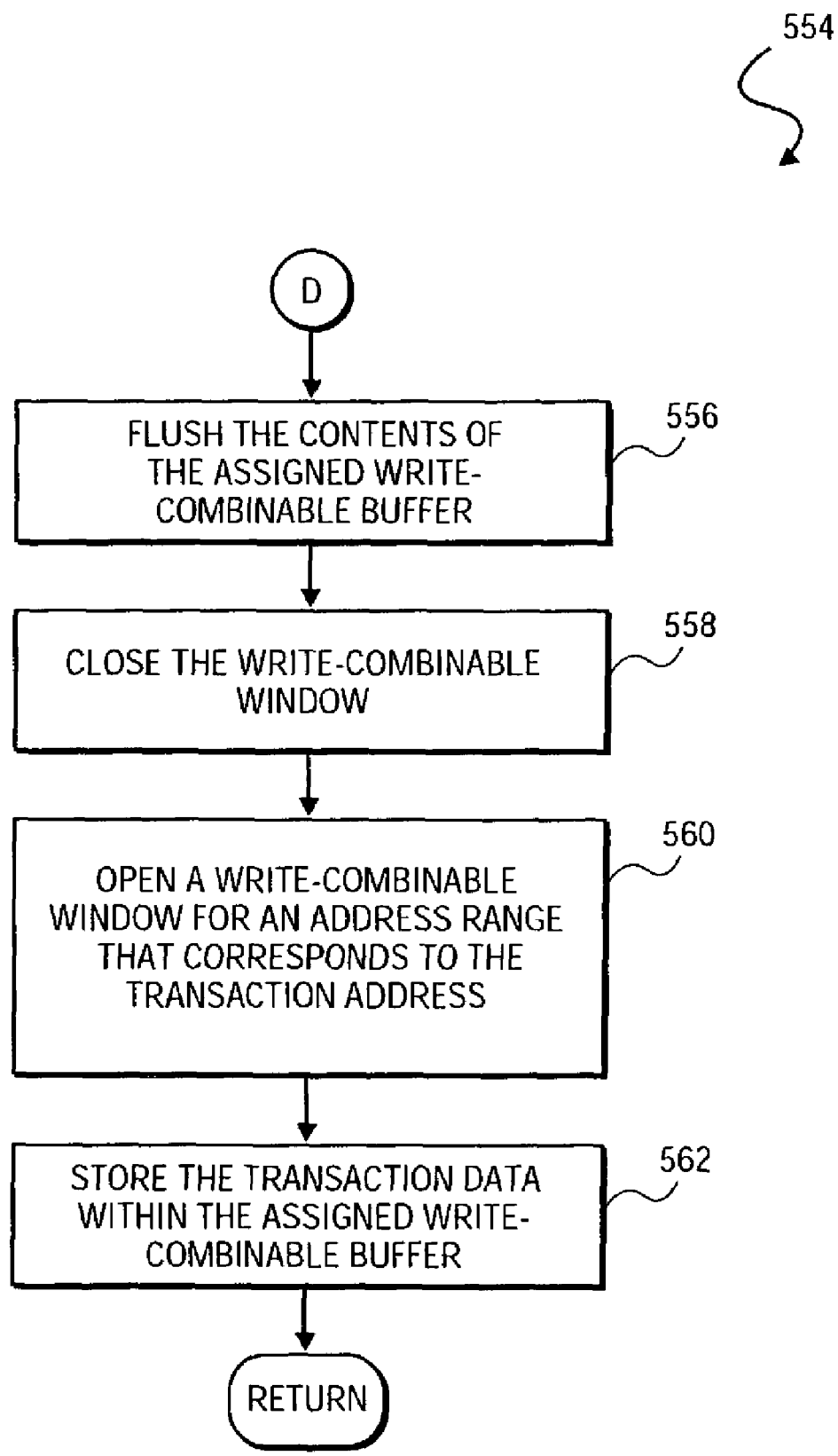
FIG. 10 depicts a flow chart illustrating a method for storing transaction data within a write-combining buffer when all write-combining windows within a write-combining area are closed, in accordance with a further embodiment of the present invention.

FIG. 10 is a flow chart illustrating a method 554 for performing I/O write-combining when an open WC window is detected, in accordance with a further embodiment of the present invention. When correspondence is not detected at process block 552 (FIG. 9), process block 556 is performed. At process block 556 the contents of the assigned write-combining buffer are flushed to a corresponding I/O device. Once flushed, at process block 558, the open write-combining window is closed. At process block 560, a write-combining window is opened for an address range that corresponds to the transaction address. Once opened at process block 562, the transaction data is stored within the write-combining buffer assigned to the identified write-combinable range.

Accordingly, as illustrated with reference to FIGS. 8–10, one embodiment of the present invention opens and closes write-combining windows within the designated write-combinable ranges, according to the transaction address of write transactions directed to I/O devices. According to this embodiment, when an open write-combining window address range corresponds to a transaction address, data is stored within the assigned WC buffer, unless overlapping data is detected. When overlapping data is detected, the contents of the assigned buffer are flushed. Subsequently, the new transaction data is stored in the assigned buffer.

Otherwise, when a write-combining window is not opened within the write-combinable range, a write-combining window is opened within an address range that corresponds to the transaction address of the detected write transaction request. In other words, depending on the transaction address, a write-combining window is opened such that the transaction address falls within an address range assigned to the write-combining window. In one embodiment, the address range of the window is based on a size specified within WCWINDOW register 328, as depicted in FIG. 2.

As illustrated above, in one embodiment, flow charts shown in FIGS. 5–10 describe methods according to embodiments of the present invention for outbound I/O write-combining within, for example, a system chipset or memory controller hub (MCH) of the computer system. However, in one embodiment, software, such as, for example, an I/O device driver is required to initialize one or more write-combining configuration registers of the chipset MCH or the like. For example, as depicted with reference to FIG. 2, in one embodiment, WCREG 320 may be loaded with values that govern outbound I/O write-combining.

Figure 11:
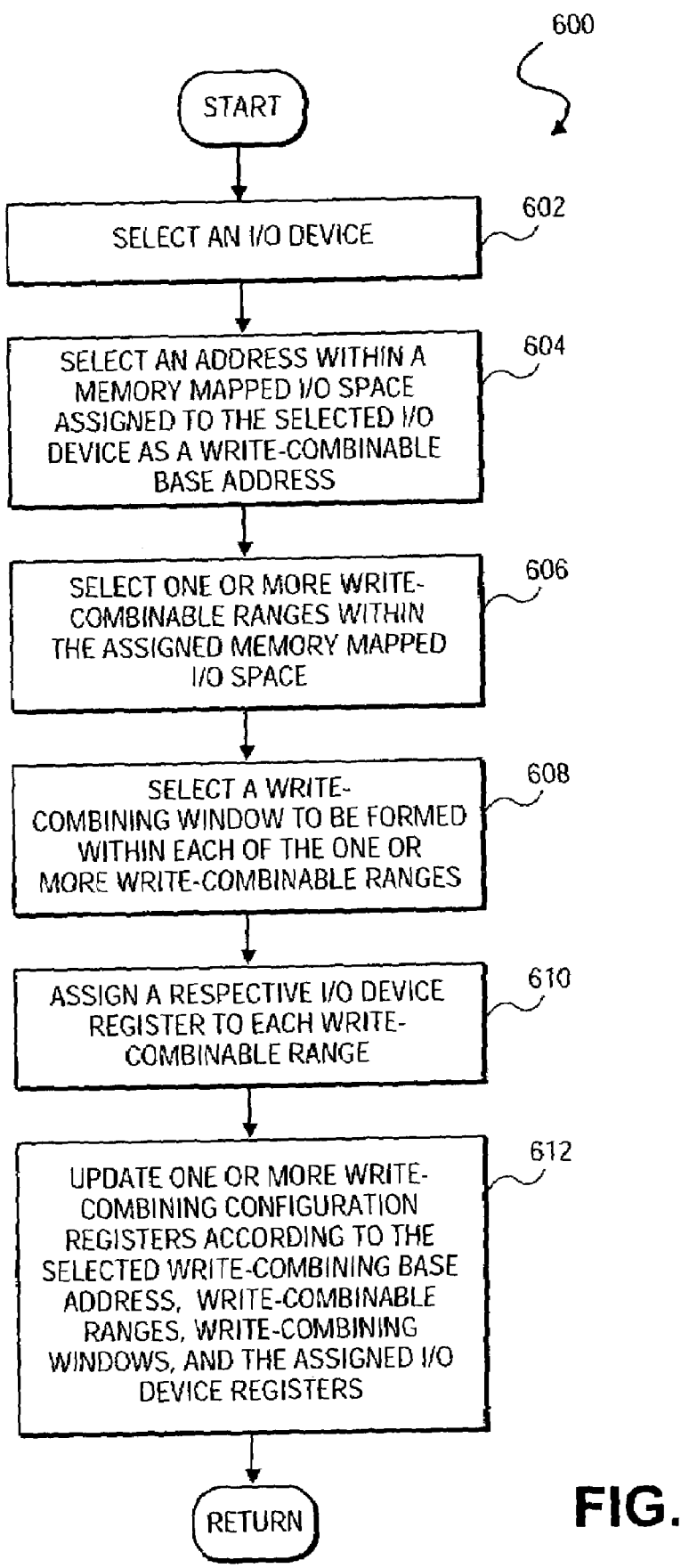
FIG. 11 depicts a flow chart illustrating a method for configuring a device to perform write-combining of write-transaction data directed to an I/O device, in accordance with a further embodiment of the present invention.

Accordingly, FIG. 11 is a flow chart illustrating a method 600 for configuration of one or more write-combining configuration registers to direct performance of outbound I/O write-combining, in accordance with one embodiment of the present invention. At process block 602 an I/O device coupled to, for example, a system chipset, is selected. Once selected, at process block 604 an address within a memory mapped I/O space, assigned to the selected I/O device, is selected as a write-combining base address.

Figure 3:
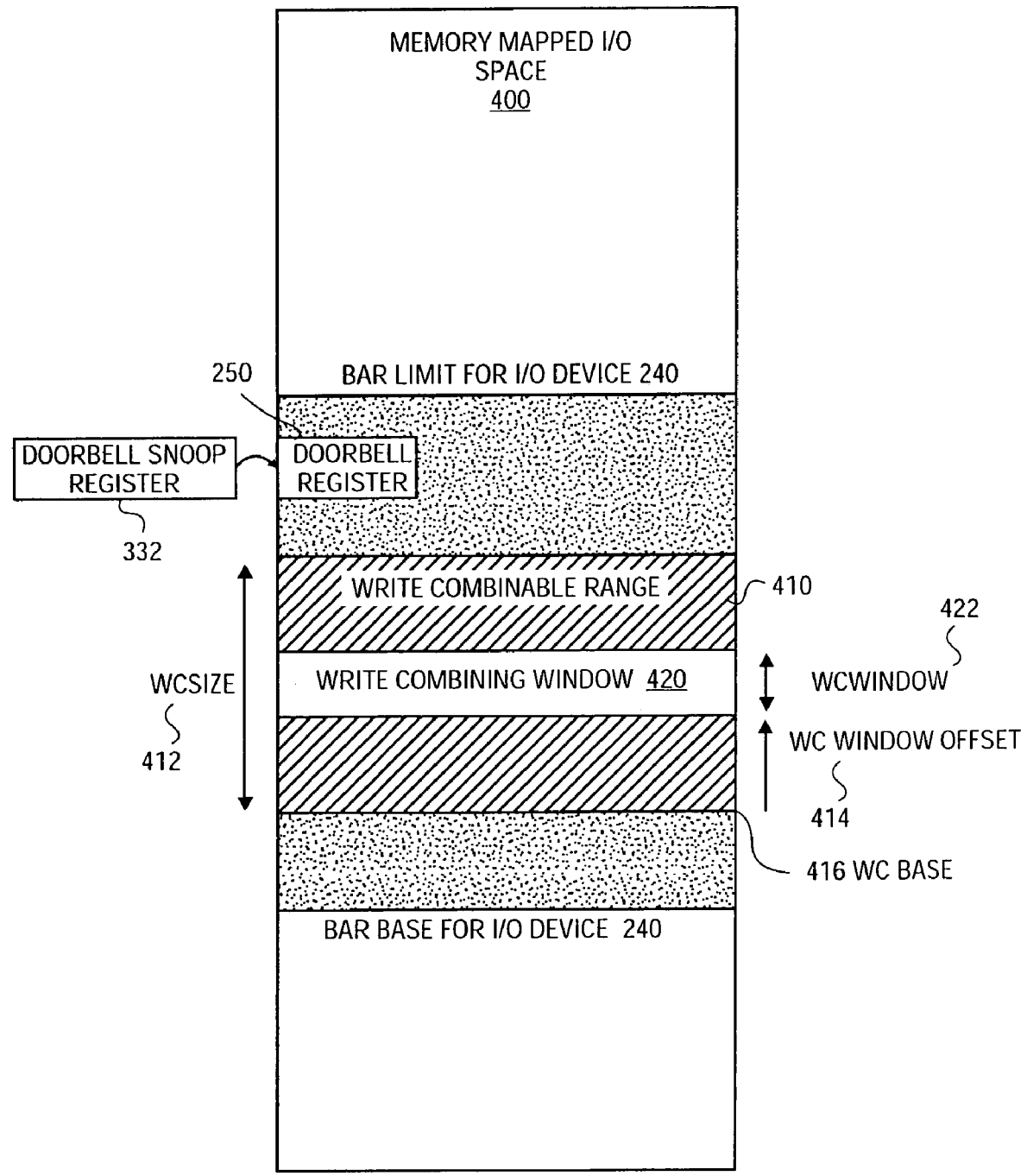
FIG. 3 depicts a block diagram illustrating write-combining of the memory mapped I/O space, in accordance with the further embodiment of the present invention.
Figure 4:
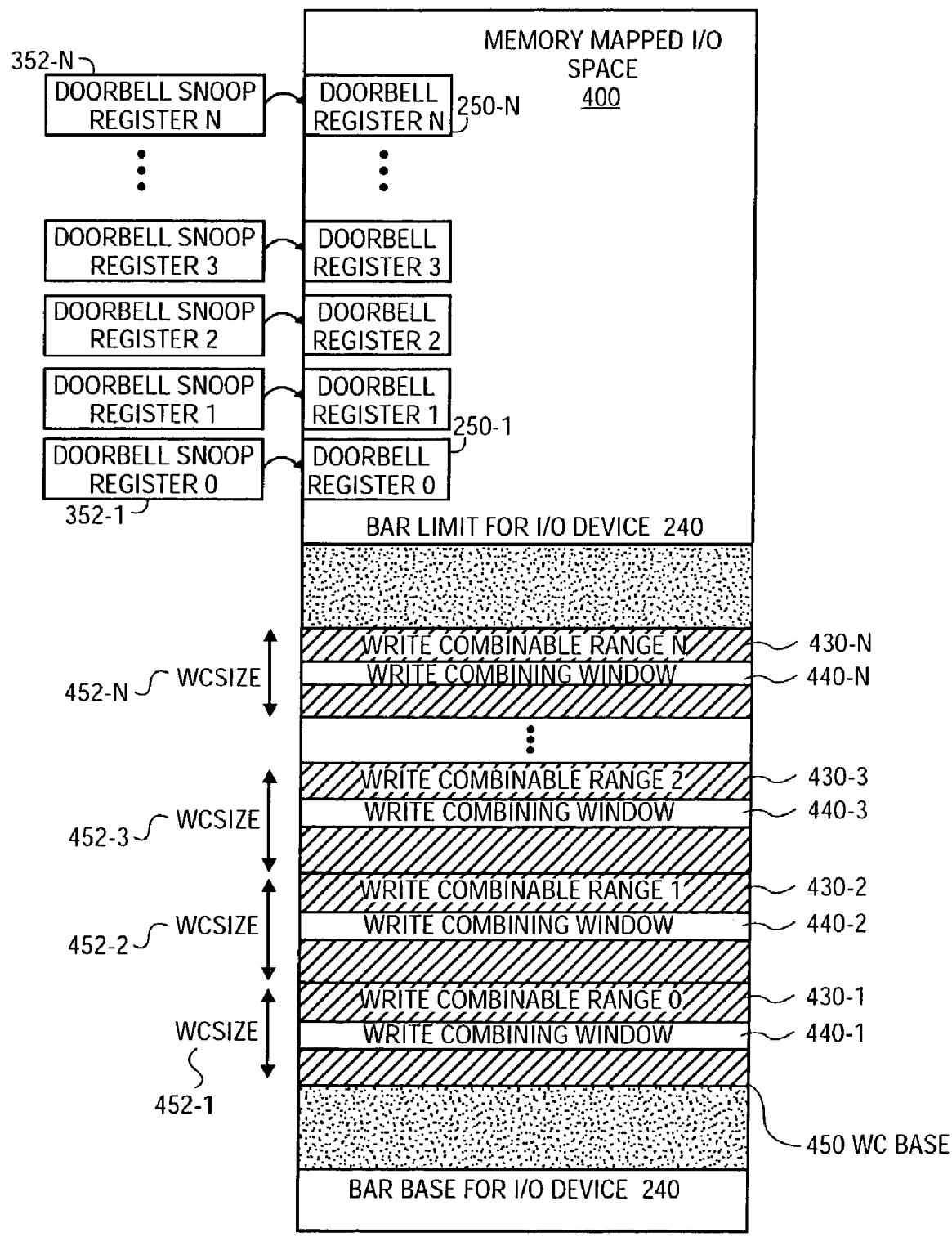
FIG. 4 depicts a block diagram illustrating write-combining with memory mapped I/O space including a plurality of write-combinable ranges, in accordance with a further embodiment of the present invention.

For example, as depicted with reference to FIGS. 3 and 4 a write-combining base address (416/450) is selected. Once selected, at process block 606 one or more write-combinable ranges are selected within the mapped I/O address space. Next, at process block 608 a WC window, to be formed within each of the one or more write-combinable ranges, is selected. Accordingly, as illustrated with reference to FIGS. 3 and 4, in one embodiment I/O device driver software is responsible for selecting the write-combinable range(s), as well as the write-combining window to be formed within the write-combinable range(s).

At process block 610, a respective I/O device register is assigned to each selected write-combinable range. In one embodiment, the device driver software maps each I/O device register to a respective chipset register. At process block 612, one or more write-combining configuration registers are updated according to the selected write-combining base address, the selected write-combinable ranges, the selected write-combining windows, and the assigned I/O device registers. In one embodiment, each chipset register is loaded with the value that identifies a memory range mapped to a selected I/O device register which is referred to herein as a "doorbell register." Likewise, the chipset register containing the identifying values are referred to herein as "doorbell snoop register," for example, as depicted with reference to FIG. 2.

Figure 12:
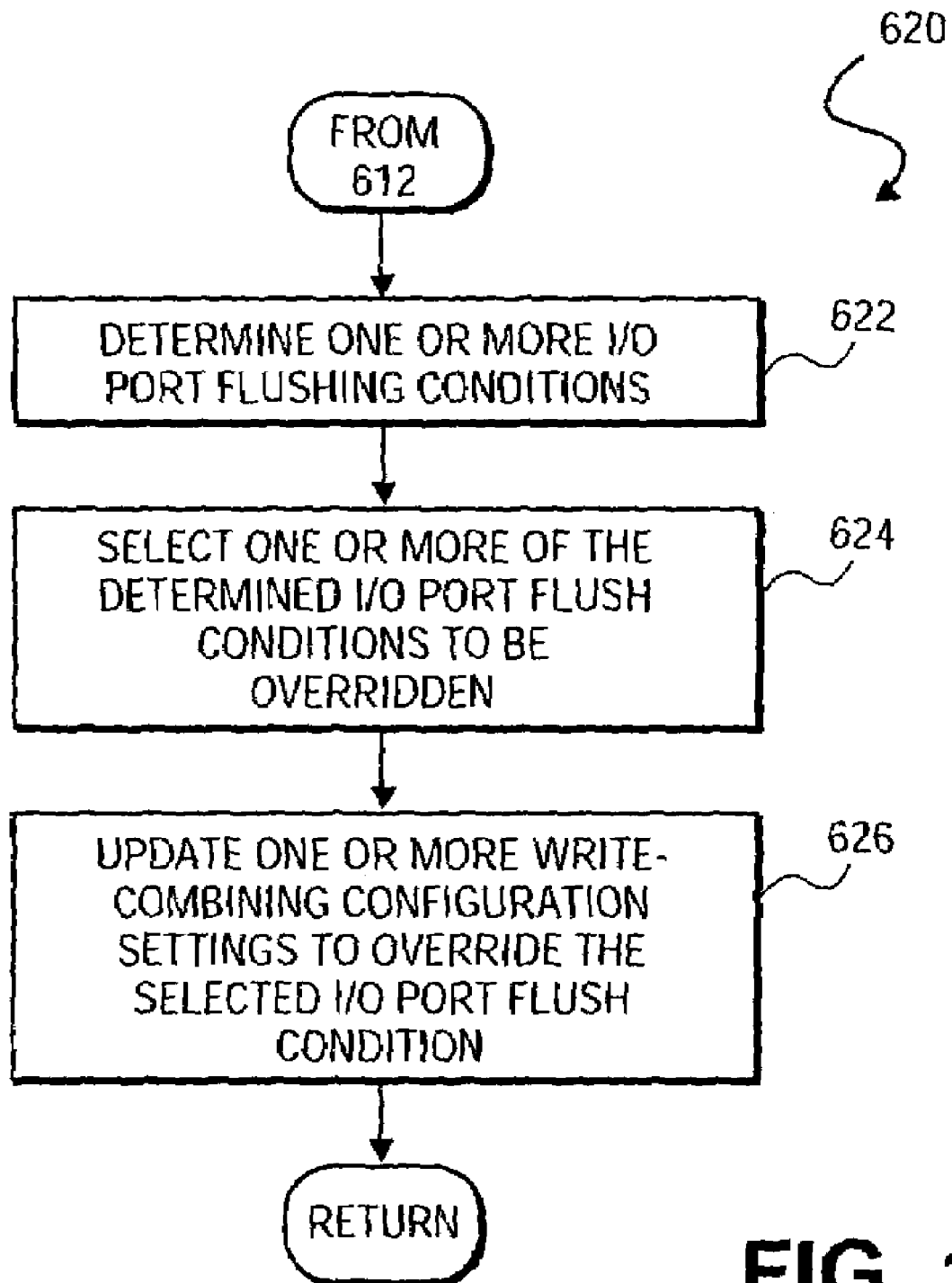
FIG. 12 depicts a flow chart illustrating a method for configuring a device in order to override one or more I/O port flush conditions, in accordance with a further embodiment of the present invention.

FIG. 12 is a flow chart illustrating a method 620 for updating the write-combining configuration registers in accordance with one embodiment of the present invention. At process block 622 one or more I/O port flushing conditions are determined according to an I/O protocol of the I/O devices coupled to the chipset. Once determined, at process block 624 one or more of the determined I/O port flush conditions are selected to be overridden. Once selected, at process block 626 one or more write-combining configuration settings are updated to override the selected I/O port flush conditions.

For example, the I/O port flush conditions described above may be based on the strict program order requirements of the I/O protocol. However, by utilizing the doorbell snoop registers, device driver software is able to maintain the program order requirements by flushing the various WC buffers when necessary. As a result, needless flushing of the WC buffers may be prevented by the device driver software by setting WCCTL registers 340 of WC flush logic 330, as depicted in FIG. 2. Accordingly, by limiting the needless flushing of WC buffers, burst performance optimizations may be applied to write transactions directed to I/O devices.

Figure 13:
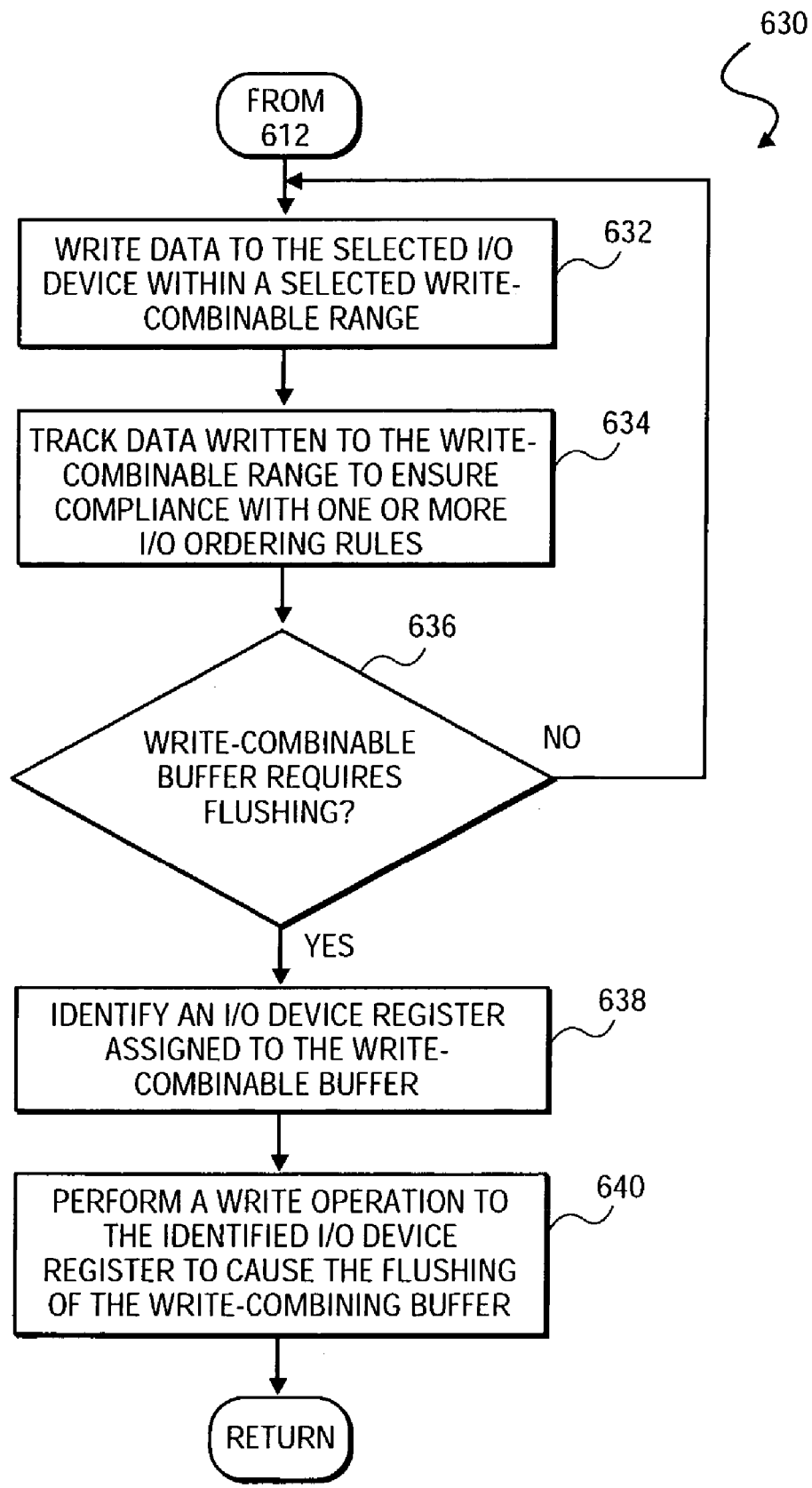
FIG. 13 depicts a flow chart illustrating a method for writing data to an I/O device having a selected write-combinable range, in accordance with a further embodiment of the present invention.

FIG. 13 is a flow chart 630 illustrating a method for writing data to an I/O device coupled to a chipset implementing outbound I/O write-combining, in accordance with a further embodiment of the present invention. At process block 632, data is written to an I/O device selected for outbound I/O write-combining. The data is provided as a write transaction request with a transaction address that falls within a write-combinable range selected for the I/O device. At process block 634, data written to the write-combinable range is tracked to ensure compliance with one or more I/O ordering rules.

At process block 636, it is determined whether a WC buffer requires flushing. When such is detected, at process block 638 an I/O device register assigned to the write-combining buffer is identified. Once determined, at process block 640 a write transaction request is issued to the identified I/O device register. In one embodiment, a write to a doorbell register directs the chipset to flush the contents of a corresponding WC buffer. As indicated above, the chipset can detect such a write based on values contained within its doorbell snoop registers, which identify an area of memory mapped to the I/O device registers assigned as doorbell registers.

In other words, when I/O device driver software desires flushing of a WC buffer, the device driver software, in essence, rings the doorbell register of the I/O device with a write transaction request directed thereto. In one embodiment, this write transaction request is intercepted by the chipset and a transaction address is compared to values contained within the snoop registers. When a match is detected, a corresponding WC buffer is identified. Once identified, the chipset causes flushing of data contents of the identified WC buffer.

Accordingly, I/O device driver software is able to comply with the strict program order requirements associated with I/O devices and, specifically, the I/O device protocol. In addition, various flushing conditions required by the I/O protocol may be overridden and maintained by the device driver software to prevent needless flushing of the WC buffers. Otherwise, needless flushing of the WC buffers clogs the I/O bus and degrades system performance. As such, by limiting the number of partial I/O device writes, burst performance provided by a processor may be applied to write transactions directed to I/O devices in order to improve system performance.

ALTERNATE EMBODIMENTS

Several aspects of one implementation of the outbound I/O write-combining for providing burst performance to writes to an I/O device have been described. However, various implementations of the outbound I/O write-combining provide numerous features including, complementing, supplementing, and/or replacing the features described above. Features can be implemented as part of a single chipset or as part of a chipset including separate memory controllers and I/O controllers in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with reference to one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
   detecting a write transaction request directed to a memory range mapped to an input/output (I/O) device;
   intercepting the detected write transaction request if a transaction address associated with the detected write transaction falls within a predetermined write-combinable range of the memory range mapped to the I/O device;
   storing data associated with the intercepted write transaction within a buffer assigned to the write-combinable range, the buffer having an associated, predetermined register and flushing data contents of the buffer to the I/O device if a write transaction is detected having a transaction address that is within a memory range mapped to the predetermined register and a transaction target that matches the predetermined register;
   detecting a predetermined I/O port flush condition;
   determining whether an initialization setting is set to override the detected flush condition; and
   disregarding the detected I/O port flush condition if an override setting corresponding to the flush condition is detected.

2. The method of claim 1, wherein flushing the data contents further comprising:
   determining whether the transaction address identifies a memory range mapped to the predetermined register if the transaction address falls outside the write-combinable range;
   identifying the buffer associated with the predetermined register if the transaction target matches the predetermined register;
   flushing data contents of the identified buffer to the I/O device; and
   forwarding the detected write transaction request to the predetermined register.

3. The method of claim 1, wherein the method prior, to detecting the write transaction, further comprises:
   receiving a first value indicating an address within a memory mapped I/O space assigned to the I/O device selected as a write-combining base address;
   receiving a second value indicating a size of one or more write-combinable ranges within the memory mapped I/O space assigned to the I/O device;
   receiving a third value indicating a number of write-combinable ranges to be formed within the memory mapped I/O space assigned to the I/O device;
   receiving a fourth value indicating a size of a write-combining window to be formed within each of the one or more write-combinable ranges; and
   assigning a respective buffer to the write-combining windows.

4. The method of claim 1, wherein intercepting the detected write transaction further comprises:
   identifying a target I/O port of the detected write transaction;
   calculating one or more write-combinable ranges for the target I/O port according to a write-combining base address, a write-combinable range size and a count of the number of write-combinable ranges to be formed within the memory mapped I/O space assigned to the I/O device; and comparing the transaction address with the one or more write-combinable ranges to determine whether the transaction address falls within one of the one or more write-combinable ranges.

5. The method of claim 1, wherein storing the intercepted write transaction data further comprises:
identifying a write-combinable range corresponding to the transaction address;
determining whether a write-combining window assigned to the identified write-combinable range is open;
opening a write-combining window for an address range within the identified write-combinable range that corresponds to the transaction address if the assigned write-combining window is closed; and
storing data associated with the write transaction within a write-combining buffer assigned to the write combinable range.

6. The method of claim 5 further comprising:
determining whether an address of data contained within the assigned write-combining buffer corresponds to the transaction address if a write-combining window is open;
flushing the contents of the assigned write-combining buffer if a corresponding data address is detected; and
storing the transaction data within the assigned write-combining buffer after the assigned write-combining buffer is flushed.

7. The method of claim 5, further comprising:
when a write-combining window is open, determining whether the open write-combining window corresponds to the transaction address; and
flushing the contents of the assigned write-combining buffer,
storing the transaction data within the assigned write-combining buffer,
closing the write-combining window, and
opening a write-combining window for an address range within the determined write-combinable range that corresponds to the transaction address if the write-combining window does not correspond to the transaction address.

8. The method of claim 1 further comprising:
detecting a predetermined I/O port flush condition;
identifying one or more write-combinable ranges of the I/O port having an open write-combining window;
identifying a buffer assigned to each open write-combining window; and
flushing data contained within the identified buffers to a corresponding I/O device.

9. The method of claim 1, wherein the method, prior to detecting the write transaction, further comprises:
selecting an address within a memory mapped I/O space assigned to an I/O device as a write-combining base address;
selecting one or more write-combinable ranges within the assigned memory mapped I/O space;
determining a size of a write-combining window to be formed within each of the one or more write-combinable ranges;
assigning a respective I/O device register to each write-combinable range; and
updating one or more write-combining configuration registers according to the selected write-combining base address, the selected write-combinable ranges, the write-combining window size, and the assigned I/O device registers.

10. A method comprising:
selecting an address within a memory mapped I/O space assigned to an I/O device as a write-combining base address;
selecting one or more write-combinable ranges within the assigned memory mapped I/O space;
assigning a respective I/O device register to each write-combinable range; and
updating one or more write-combining configuration registers according to the selected write-combining base address, the selected write-combinable ranges, and the assigned I/O device registers.

11. The method of claim 10, wherein updating the write-combining configuration registers further comprises:
determining one or more I/O port flushing conditions;
selecting one or more of the determined I/O port flush conditions to be overridden; and
updating one or more write-combining configuration settings to override the selected I/O port flush conditions.

12. The method of claim 10, further comprising:
writing data to the selected I/O device within a selected write-combinable range; and
tracking data written to the write-combinable range to ensure compliance with one or more I/O ordering rules.

13. The method of claim 12, wherein tracking data further comprises: identifying a write-combining buffer requiring flushing of its data contents, according to a corresponding I/O port data ordering nile; identifying an I/O device register assigned to the write-combining buffer and performing a write operation to the identified I/O device register to cause the flushing of the identified write-combining buffer.

14. The method of claim 10, wherein determining the one or more write-combinable ranges further comprises:
selecting a write-combining window to be formed within each of the one or more write-combinable ranges;
selecting a size of each of the one or more write-combining windows; and
updating one or more of the write-combining configuration registers, according to the selected write-combining windows, and the selected size of the write-combining windows.

15. A computer readable storage medium including program instructions that direct a computer to function in a specified manner when executed by a processor, the program instructions comprising:
selecting an address within a memory mapped I/O space to an I/O device as a write-combining base address;
selecting one or more write-combinable ranges within the assigned memory mapped I/O space;
assigning a respective I/O device register to each selected write-combinable range; and
updating one or more write-combining configuration registers according to the selected write-combining base address, the selected write-combinable ranges, and the assigned I/O device registers.

16. The computer readable storage medium of claim 15, wherein updating the chipset registers further comprises:
determining one or more I/O port flushing conditions;
selecting one or more of the determined I/O port flush conditions to be overridden; and
updating one or more write-combining configuration register settings to override the selected I/O port flush conditions.

17. The computer readable storage medium of claim 15, further comprising:
   writing data to the selected I/O device within a selected write-combinable range; and
   tracking data written to the write-combinable range to ensure compliance with one or more I/O ordering rules.

18. The computer readable storage medium of claim 17, wherein ensuring compliance further comprises:
   identifying a write-combining buffer requiring flushing of its data contents, according to corresponding I/O port data ordering rule;
   identifying an I/O device register assigned to the write-combining buffer; and
   performing a write operation to the determined I/O device register to cause the flushing of the write-combining buffer.

19. The computer readable storage medium of claim 15, wherein determining the one or more write-combining windows further comprises:
   selecting a write-combining window to be formed within each of the one or more write-combinable ranges;
   selecting a size of each of the one or more write-combining windows; and
   updating one or more of the write-combining configuration registers according to the selected write-combining window, and the selected size of the write-combining windows.

* * * * *